United States Patent
Paz et al.

(10) Patent No.: US 10,263,298 B2
(45) Date of Patent: Apr. 16, 2019

(54) REGULATION OF METAL ION LEVELS IN LITHIUM ION BATTERIES

(71) Applicant: StoreDot Ltd., Herzeliya (IL)

(72) Inventors: Ron Paz, Rehovot (IL); Nir Kedem, Haifa (IL); Doron Burshtain, Herzliya (IL); Nir Baram, Ness-Ziona (IL); Nir Pour, Mitzpe (IL); Daniel Aronov, Netanya (IL)

(73) Assignee: StoreDot Ltd., Herzeliya (IL)

( * ) Notice: Subject to any disclaimer, the term of this patent is extended or adjusted under 35 U.S.C. 154(b) by 0 days.

(21) Appl. No.: 15/706,829

(22) Filed: Sep. 18, 2017

(65) Prior Publication Data

US 2019/0089016 A1   Mar. 21, 2019

(51) Int. Cl.
*H01M 10/42* (2006.01)
*H01M 10/0525* (2010.01)

(52) U.S. Cl.
CPC ... *H01M 10/4257* (2013.01); *H01M 10/0525* (2013.01); *H01M 2010/4271* (2013.01)

(58) Field of Classification Search
None
See application file for complete search history.

(56) References Cited

U.S. PATENT DOCUMENTS 6,335,115 B1   1/2002  Meissner
9,214,696 B2 * 12/2015  Min ..................... H01M 2/361
2005/0130043 A1   6/2005  Gao et al.
2006/0093871 A1   5/2006  Howard et al.
2009/0208834 A1   8/2009  Ramasubramanian et al.
2011/0081563 A1   4/2011  Christensen et al.
2011/0278161 A1  11/2011  Choi et al.
2015/0017543 A1   1/2015  Lee et al.
(Continued)

FOREIGN PATENT DOCUMENTS

DE   10 2015 211935   12/2016
WO   WO 2009/036444    3/2009
WO   WO 2011/083423    7/2011

OTHER PUBLICATIONS

Xiaoqi et al. "Prussian Blue Mg—Li Hybrid Batteries", Advanced Science 2016, 3, 1600044, 1-7.
(Continued)

*Primary Examiner* — Sarah A. Slifka
(74) *Attorney, Agent, or Firm* — Pearl Cohen Zedek Latzer Baratz LLP

(57) ABSTRACT

Systems and methods are provided, in which the level of metal ions in cells stacks and lithium ion batteries is regulated in situ, with the electrodes of the cell stack(s) in the respective pouches. Regulation of metal ions may be carried out electrochemically by metal ion sources in the pouches, electrically connected to the electrodes. The position and shape of the metal ion sources may be optimized to create uniform metal ion movements to the electrode surfaces and favorable SEI formation. The metal ion sources may be removable, or comprise a lithium source for lithiating the anodes or cathodes during operation of the battery according to SoH parameters. Regulation of metal ions may be carried out from metal ion sources in separate electrolyte reservoir(s), with circulation of the metal-ion-containing electrolyte through the cell stacks in the pouches prior or during the formation.

21 Claims, 13 Drawing Sheets

(56) References Cited

U.S. PATENT DOCUMENTS

2015/0275384 A1   10/2015  Viavattine et al.
2015/0364795 A1* 12/2015  Stefan ............... H01M 10/0568
                                                                          429/52

OTHER PUBLICATIONS

U.S. Office Action for U.S. Appl. No. 15/706,835, dated Dec. 26, 2017.
U.S. Final Office Action for U.S. Appl. No. 15/706,835, dated May 31, 2018.
European Search Report for Application No. 18194939.7, dated Feb. 14, 2019.

* cited by examiner

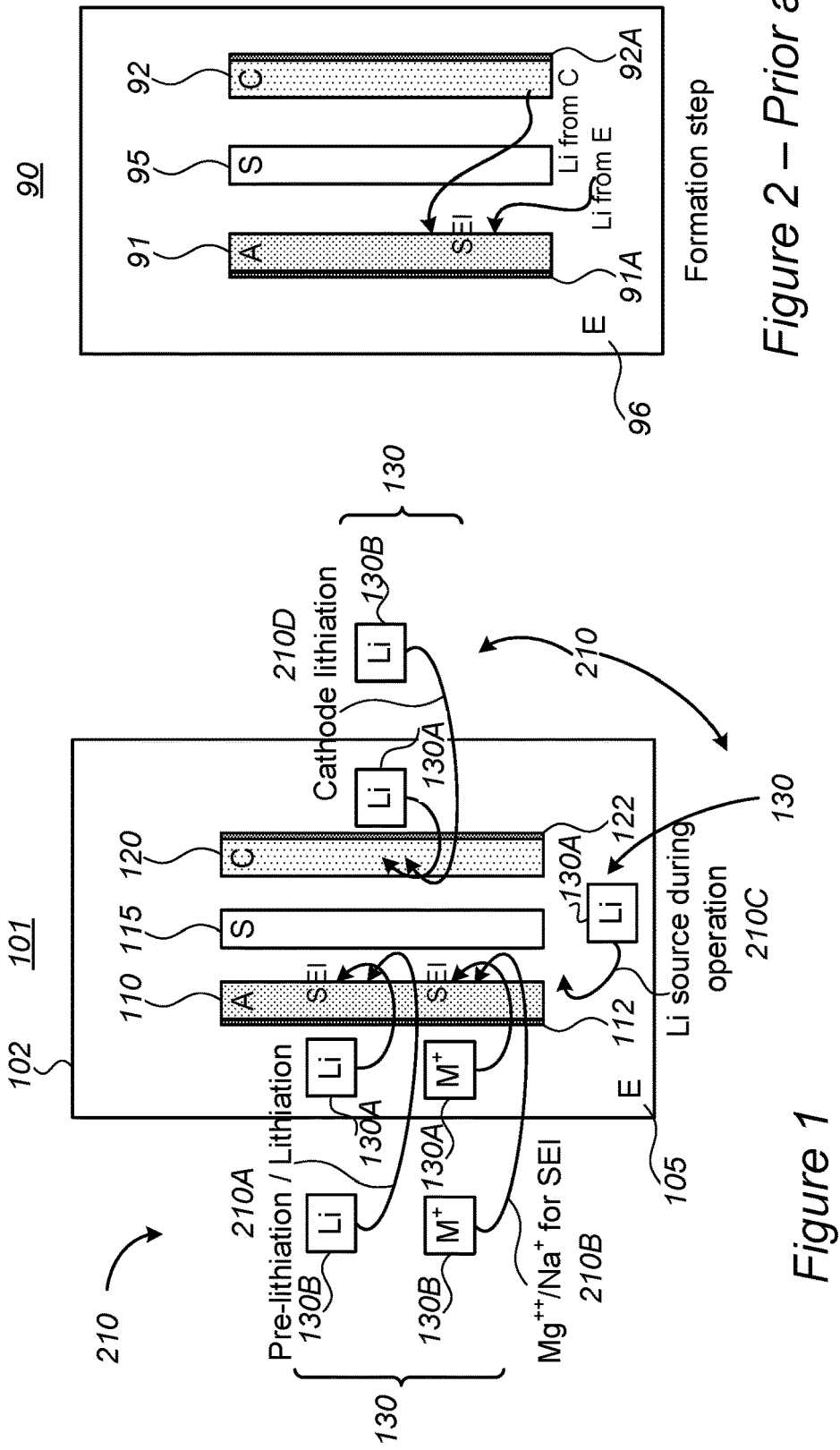

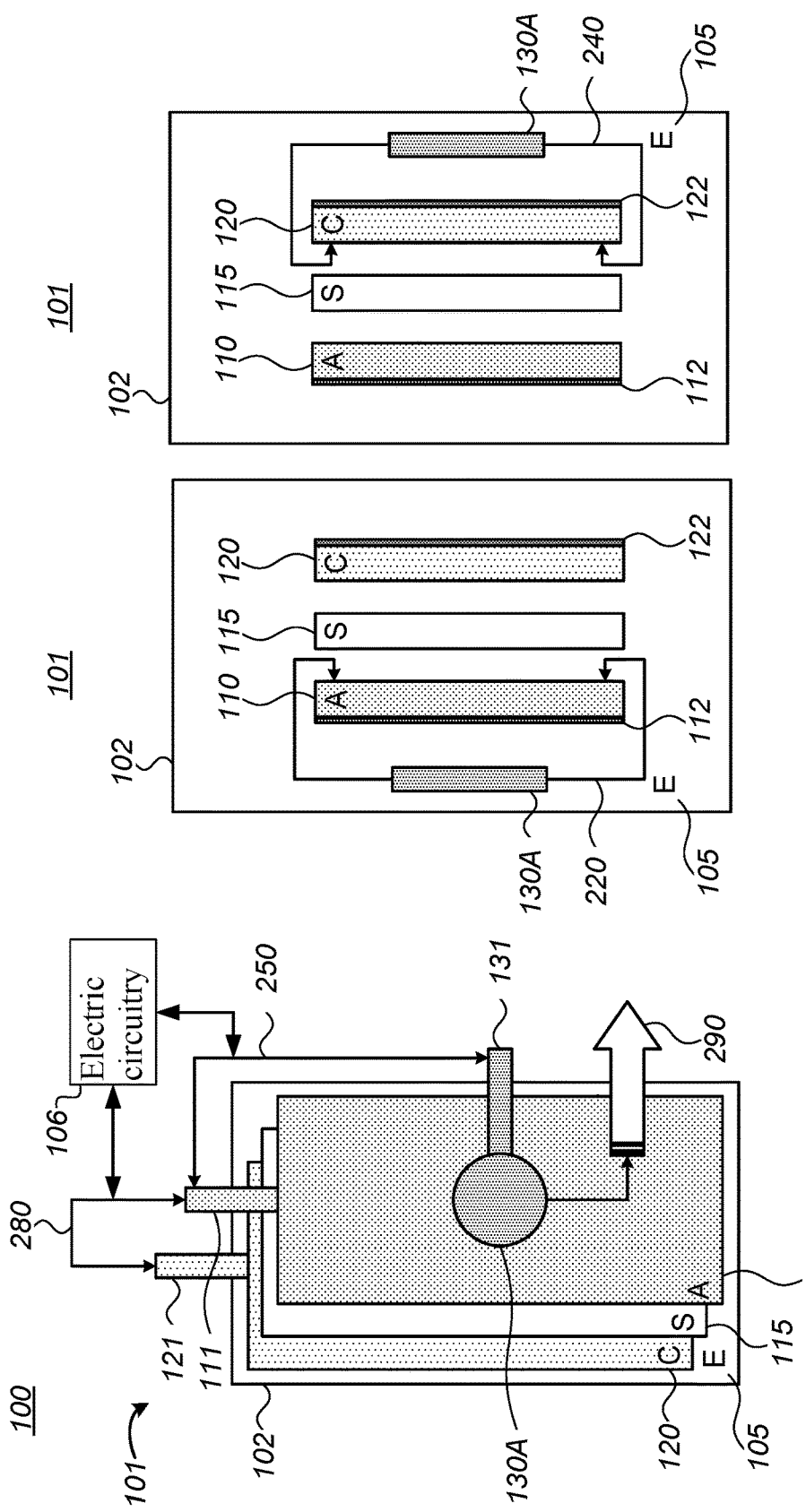

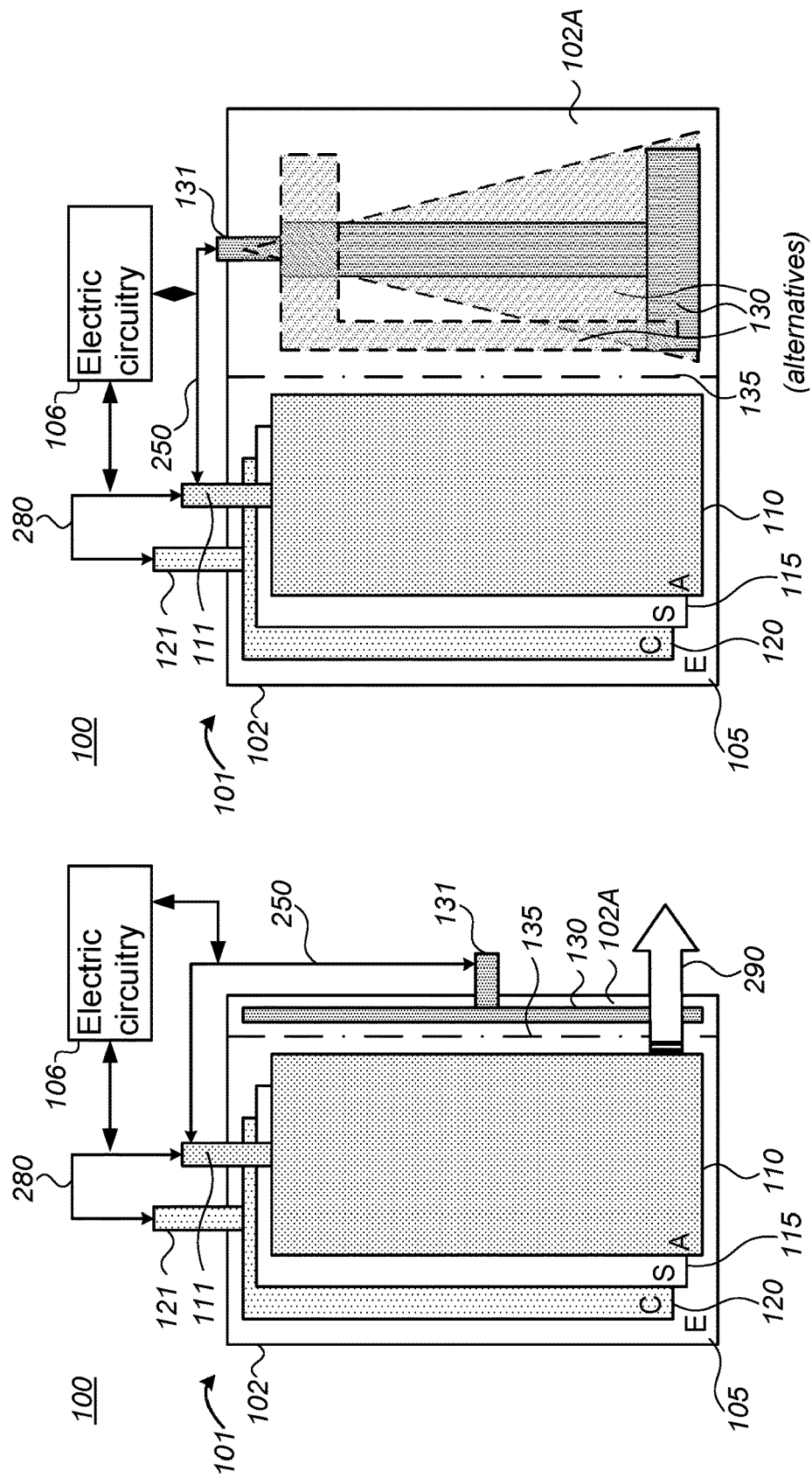

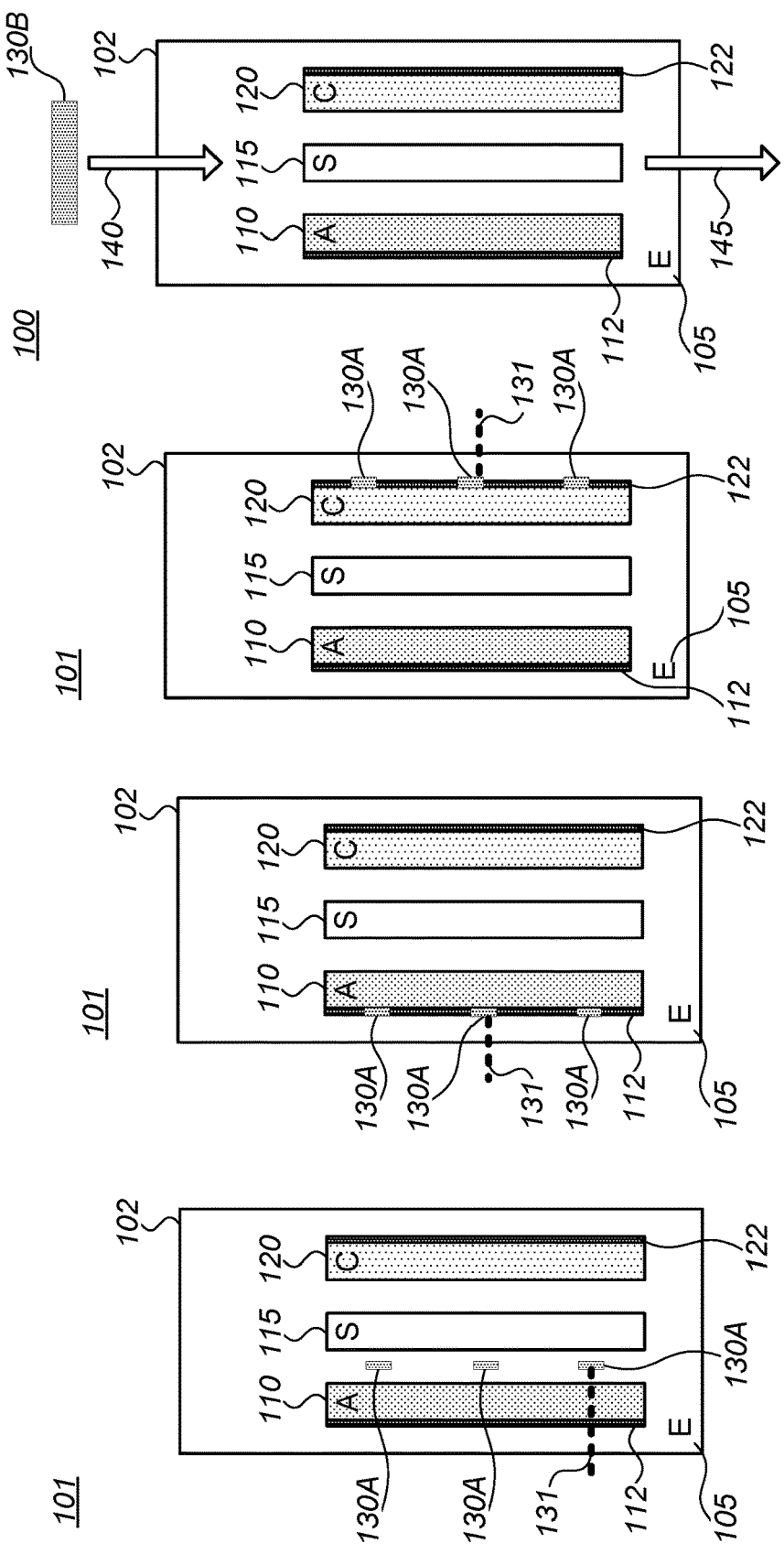

200

210 — Regulating a level of metal ions in electrode(s), e.g., anode(s) and/or cathode(s) of a cell stack for a lithium ion battery, in situ, within the battery pouch, from a metal ion source 212 — Carrying out the metal ions level regulation electrochemically, using an internal and/or an external metal ions source containing e.g., Li, Mg and/or Na 213 — Carrying out the metal ions level regulation prior to and/or during the formation step, and possibly prior to and/or during operation of the battery 220 — Pre-lithiating the anodes 225 — Lithiating the anodes during and/or after formation, possibly during operation 227 — Lithiating the anodes during operation from lithium source rudiments 230 — Using metal ions other than lithium for the formation of the SEI 240 — Lithiating the cathodes when at least partly lithium- depleted, e.g., during formation, following discharge, and possibly during operation 250 — Connecting, electrically, electrode(s) to the metal ion source and applying a voltage therebetween

*Figure 11*

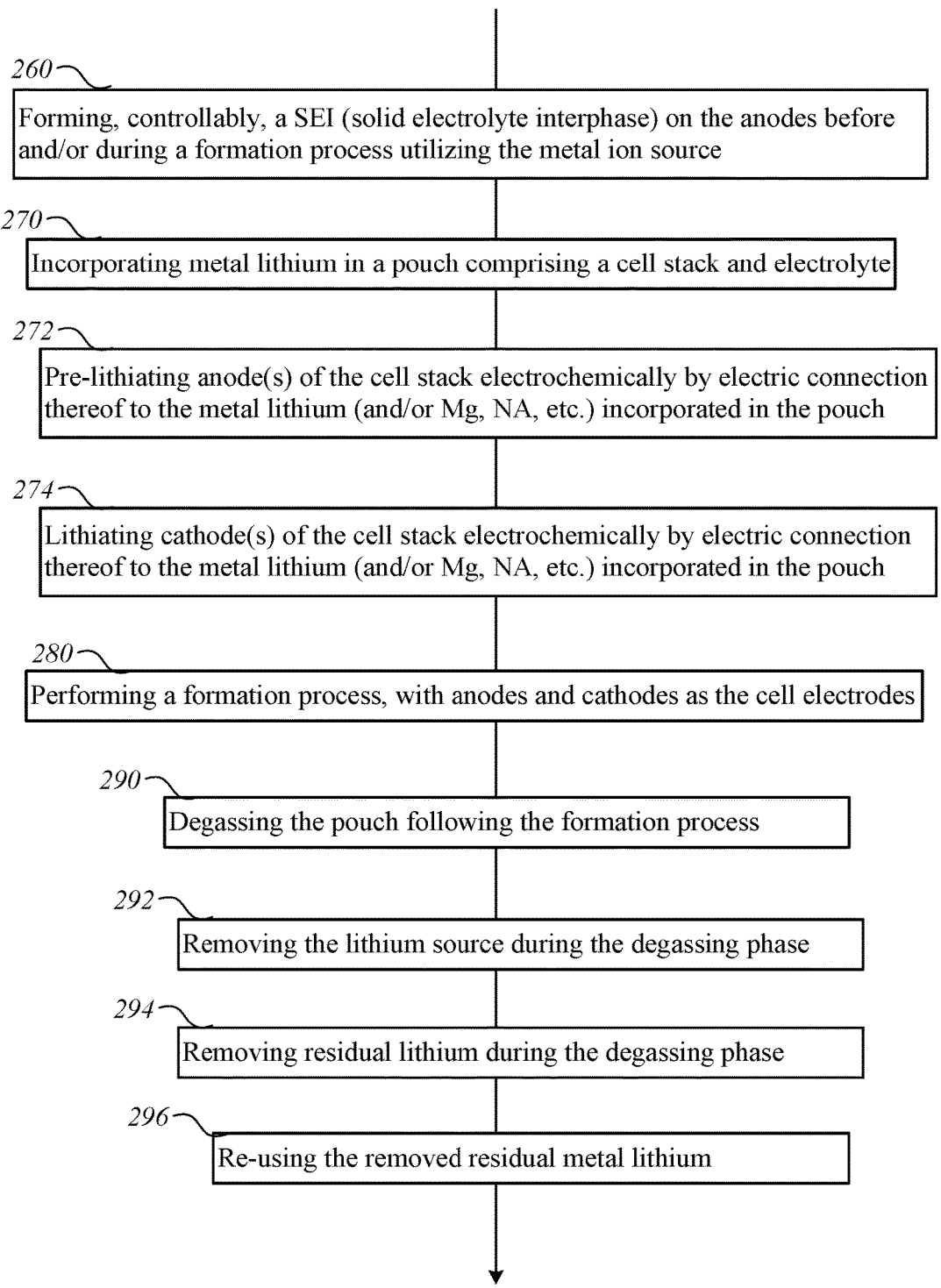
Figure 11 (Cont. 1)

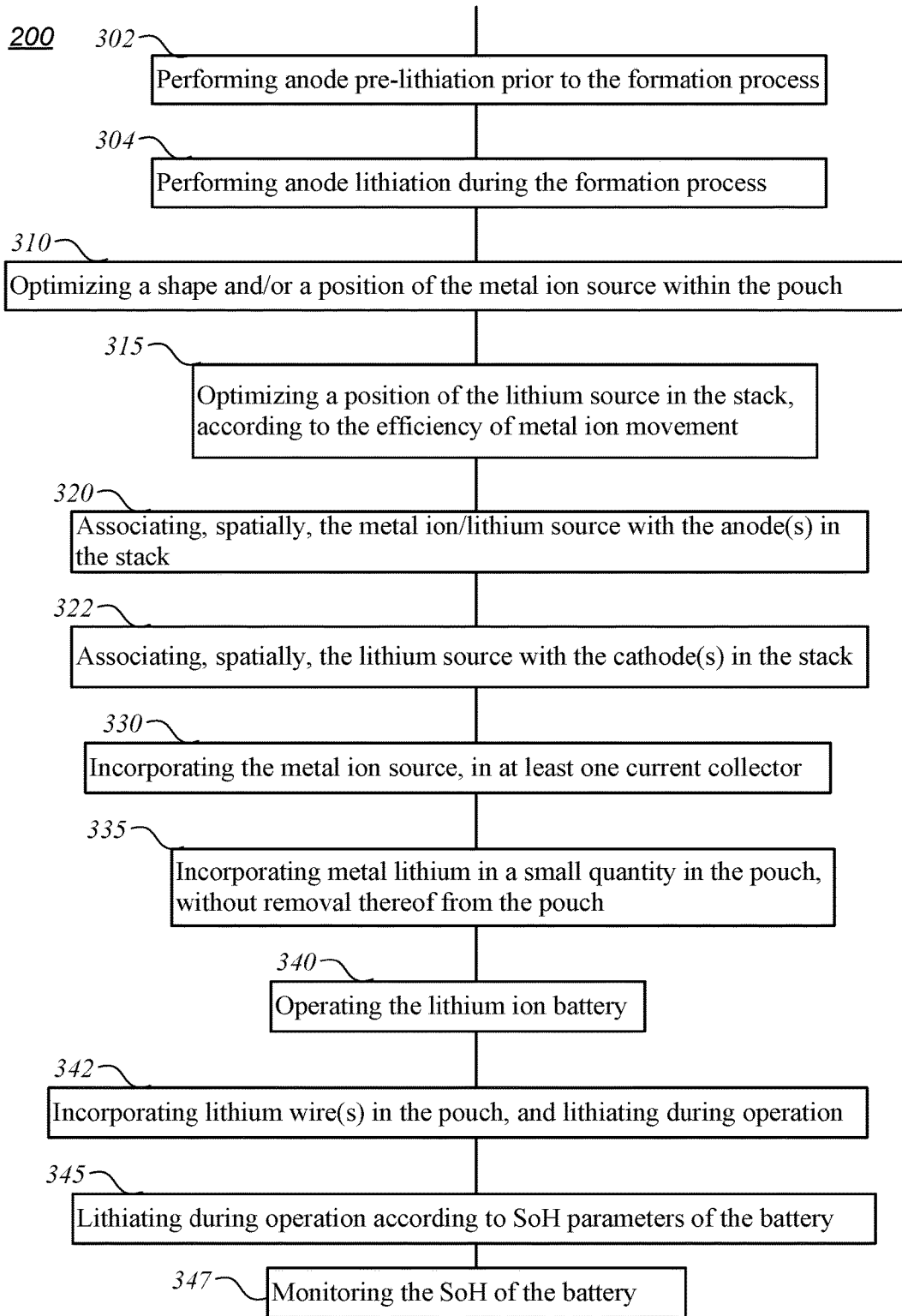
Figure 11 (Cont. 2)

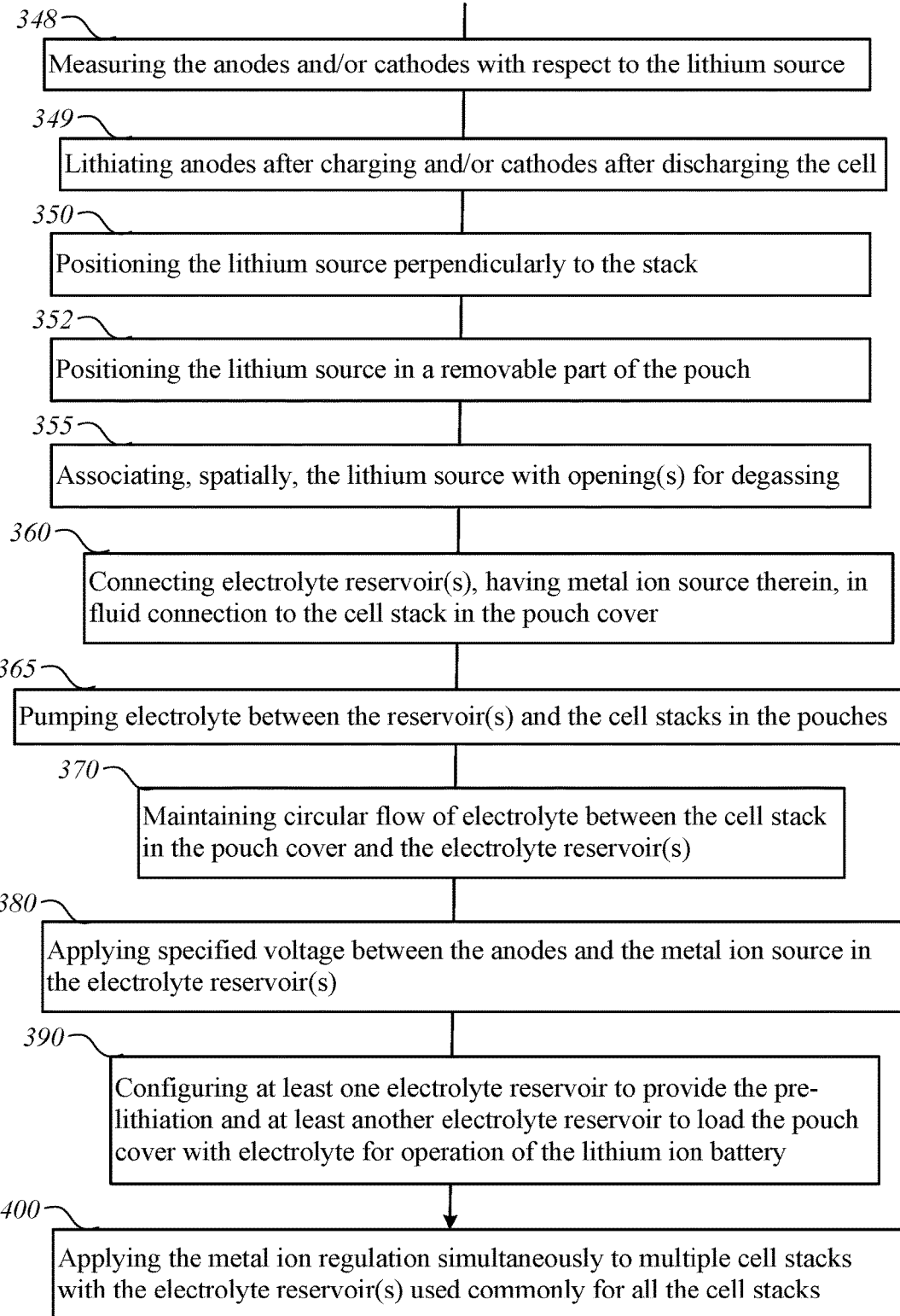
Figure 11 (Cont. 3)

REGULATION OF METAL ION LEVELS IN LITHIUM ION BATTERIES

BACKGROUND OF THE INVENTION

1. Technical Field

The present invention relates to the field of lithium ion batteries, and more particularly, to metal ion regulation processes.

2. Discussion of Related Art

Continuous effort is made to develop lithium ion batteries with longer cycling lifetime, enhanced safety and higher charging rates.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method comprising regulating a level of metal ions in at least one electrode in a lithium ion battery, when the at least one electrode is in a pouch of the lithium ion battery, wherein the regulating is carried out electrochemically between the at least one electrode and a metal ion source, at least prior to or during a formation process of the lithium ion battery.

One aspect of the present invention provides a method comprising lithiating electrodes of a lithium ion battery during its operation, carried out electrochemically between the electrodes and a lithium source which is embedded in the battery, and controllably with respect to a state of health (SoH) of the lithium ion battery.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 1 is a high level schematic illustration of metal ion regulation processes in cells for lithium ion batteries, according to some embodiments of the invention.

FIG. 2 is a high level schematic illustration of lithium consumption processes in prior art cells for lithium ion batteries.

FIGS. 3A-3C are high level schematic illustrations of cell stacks for lithium ion batteries, comprising alternating anodes, separators and cathodes packaged in a pouch cover, according to some embodiments of the invention.

FIGS. 5A and 5B are high level schematic illustrations of systems and battery configurations having a removable lithium metal source, according to some embodiments of the invention.

FIG. 6 is a high level schematic illustration of battery configurations having lithium metal sources as beads adjacent to anode(s), according to some embodiments of the invention.

FIGS. 7A and 7B are high level schematic illustrations of battery configurations having lithium metal sources which are incorporated in current collector(s), according to some embodiments of the invention.

FIGS. 8-10 are high level schematic illustrations of system configurations with fluid flow regulation of metal ion levels in one or more electrode, according to some embodiments of the invention.

FIG. 11 is a high level flowchart illustrating a method, according to some embodiments of the invention.

DETAILED DESCRIPTION OF THE INVENTION

Figure 4C:
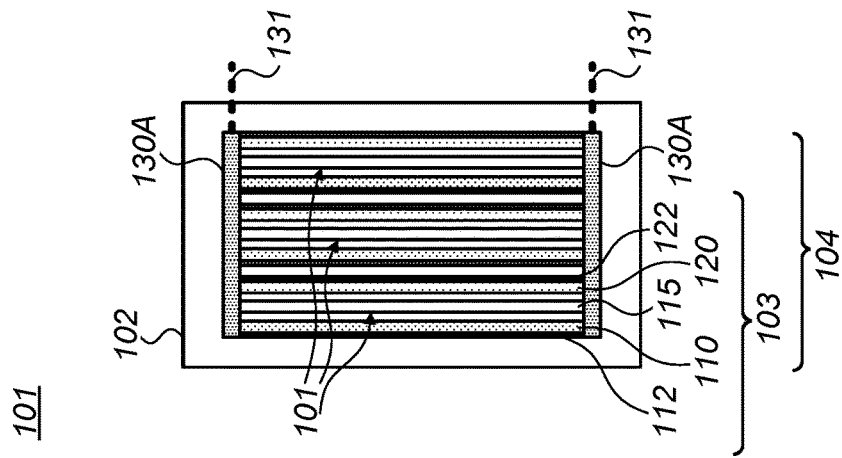
FIGS. 4A-4C are high level schematic illustrations of systems and battery configurations having various lithium metal sources, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing", "deriving", "distinguishing", "monitoring" or the like, may refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Embodiments of the present invention provide efficient and economical methods and mechanism for lithiating electrodes (e.g., anodes and/or cathodes) of lithium ion cells, and thereby provide improvements to the technological field of lithium ion batteries. In particular, pre-lithiation may provide lithium in advance, to compensate for lithium that is removed from the cathode during formation and is fixated in the SEI (solid electrolyte interphase).

Systems and methods are provided, in which the level of metal ions in cells stacks and lithium ion batteries is regulated in situ, with the electrodes of the cell stack(s) in the respective pouches. Regulation of metal ions may be carried out electrochemically by metal ion sources in the pouches, electrically connected to the electrodes. The position and shape of the metal ion sources may be optimized to create uniform metal ion movements to the electrode surfaces and favorable SEI formation. The metal ion sources may be removable, possibly during the degassing phase after the formation process, or be left in the pouch to provide additional metal ions such as lithium during operation. Regulation of metal ions may be carried out from metal ion sources in separate electrolyte reservoir(s), with circulation of the metal-ion-containing electrolyte through the cell stacks in the pouches prior or during the formation. Systems and methods are provided, in which the electrodes of the lithium ion battery are lithiated during the operation of the battery, electrochemically between the respective electrodes and a lithium source which is embedded in the battery, and controllably with respect to the state of health (SoH) of the lithium ion battery.

FIG. 1 is a high level schematic illustration of metal ion regulation processes 210 in cells for lithium ion batteries 101, according to some embodiments of the invention. FIG. 2 is a high level schematic illustration of lithium consumption processes in prior art cells for lithium ion batteries 90. FIGS. 1 and 2 are high level schematic illustrations of cells for lithium ion batteries 101, comprising anode(s) 110 (with current collector(s) 112), separator(s) 115 and cathode(s) 120 (with current collector(s) 122), packaged with an electrolyte 105 in a pouch cover 102, according to some embodiments of the invention, and of prior art cells for prior art lithium ion batteries 90, comprising anode(s) 91 (with current collector(s) 91A), separator(s) 95 and cathode(s) 92 (with current collector(s) 92A), packaged with an electrolyte 96 in a pouch cover, respectively. FIGS. 1 and 2 illustrate a schematic plan view along an axis perpendicular to anodes 110, 91 (denoted "A"), separators 115, 95 (denoted "S") and cathodes 120, 92 (denoted "C"), respectively. It is noted that the figures are very schematic, and merely relate to the ordering of some of the elements of the battery, without reflecting realistic spatial relations, for the sake of clarity of explanation. It is further noted that FIGS. 1 and 2 do not illustrate, for simplicity reasons, the fact that electrolytes 105, 96 (denoted "E") contact respective anodes 110, 91 and cathodes 120, 92 in separate compartments, delimited by respective separators 115, 95.

While in prior art FIG. 2 lithium (Li) is consumed from cathode 92 and/or from electrolyte 96 to form the SEI during the formation step(s) of anode 91 (and possibly during operation as well, to a smaller extent)—the inventors have found that lithium consumption may be mitigated and/or compensated for by any of the following ways, involving regulation of a level of metal ions in at least one electrode (e.g., anode(s) and/or cathode(s)) in the lithium ion battery—illustrated schematically in FIG. 1 as stage 210 with several varieties, and presented in further detail below.

For example, the formation step may be preceded by a pre-lithiation step 210A of anode(s) 110, delivering additional lithium from an external source 130B and/or from an internal source 130A (with respect to battery pouch 102), as explained below, e.g., in FIGS. 3A-7B and in FIGS. 8-10, respectively. Either source 130A, 130B is referred to below, in corresponding embodiments, as source 130.

In some embodiments, alternative or complementary, lithiation 210A of anode(s) 110 may be carried out during the formation step, or possibly even after the formation step and/or during operation, from internal source 130A.

In some embodiments, alternatively or complementarily, the formation of SEI on anode(s) 110 may be carried out at least partly using a metal ion source 130, providing 210B e.g., Li, Mg, Na, $Li^+$, $Mg^{++}$, $Na^+$ and/or other metal atoms and/or ions to participate in SEI formation, sparing at least some of the lithium consumed in the prior art in the formation process. For example, the inventors note that advantageously, magnesium may be used to form SEI without a risk of dendrite formation, enhancing the battery safety, and moreover having various operational advantages such as cost and safety considerations. Hybrid Mg and Li sources may also be used, possibly with electrolyte salts such as $Mg(BH_4)_2$—$LiBH_4$ and/or APC (all phenyl complex, comprising $Ph_xMgCl_{2-x}$ and $Ph_yAlCl_{3-y}$)—LiCl in, e.g., THF (tetrahydrofuran). Adaptation of applied voltages 250 (see, e.g., FIG. 3A) and other operational adaptations relate to Mg redox potential being ca. 0.67V higher than Li. In some embodiments, Na may be used in place of, or in addition to Mg, possibly with electrolyte salts such as $NaPF_6$ and/or $NaClO_4$, which are advantageously similar to $LiPF_6$ and/or $LiClO_4$ used in typical electrolytes, with the system being adapted according to Na redox potential being ca. 0.33V higher than Li.

Metal ion source 130 may be an internal and/or an external source (denoted 130A, 130B, respectively), as illustrated below, e.g., in FIGS. 3A-7B and in FIGS. 8-10, respectively. Metal ion source 130 may be configured to provide more than one type of metal ions, possibly at a pre-configured quantitative proportions and temporal order. For example, metal ion source 130 may be configured to provide mainly $Mg^{++}$ for SEI formation prior and/or during the formation step, and to provide mainly $Li^+$ during and/or after the formation step, possibly to supplant lithium during the operation of batteries 101.

In some embodiments, internal metal ion source 130A (e.g., lithium source) may be maintained within battery pouch 102 during operation of battery 101 and be configured to provide lithium ions 210C to compensate for lithium ion consumption during operation as illustrated below, e.g., in FIGS. 3C, 6, 7A and 7B.

In some embodiments, alternative or complementary, external metal ion source 130B and/or internal lithium source 130A (e.g., lithium sources) may be used to compensate 210D for lithium depletion from cathode 120, by lithiating cathode 120 during the formation process, after the formation process and/or during operation as illustrated below, e.g., in FIGS. 3C and 7B.

In the following, any of pre-lithiation 210A, anode lithiation 210A during formation, provision 210B of metal ions to form the SEI, provision 210C of lithium ions during operation and cathode lithiation 210D may be carried out by disclosed systems under corresponding operation procedures, and are designated commonly as metal ion regulation steps 210.

FIGS. 3A and 3B are high level schematic illustrations of cell stacks for lithium ion batteries 101, comprising alternating anodes 110, separators 115 and cathodes 120 packaged in pouch cover 102, according to some embodiments of the invention. FIG. 3A illustrates a schematic plan view along an axis perpendicular to anodes 110 (denoted "A"), separators 115 (denoted "S") and cathodes 120 (denoted "C") and FIG. 3B is a side view of anodes 110, separators 115 and cathodes 120. It is noted that the figures are very schematic, and merely relate to the ordering of some of the elements of the battery, without reflecting realistic spatial relations, for the sake of clarity of explanation. An electrolyte 105 (denoted "E") contacts anodes 110 and cathodes 120 in separate compartments, delimited by separators 115, a feature which is not shown in the figures.

FIGS. 3A and 3B illustrate systems 100 and batteries 101, which comprise a lithium metal source 130A within pouch cover 102, having an external contact 131 (e.g., one or more external contact(s) 131 such as metallic tabs) electric circuitry 106 (shown schematically), configured to pre-lithiate 210A (indicated schematically, in relation to SEI formation on anodes 110, and see FIG. 1) anodes 110 electrochemically, by applying specified voltage between anodes 110 (e.g., via external contacts 111 thereof, indicated schematically as electric connection and voltage application 250) and metal ion source 130A in pouch cover 102 (e.g., via external contacts 131 thereof), prior to a formation process 280 of the lithium ion battery (e.g., via external contacts 111, 121 of anode(s) 110 and cathode(s) 120, respectively). Formation 280 may be followed by degassing 290 and possibly removal of metal ion source 130. As illustrated schematically in FIG. 3B, prelithiation 210A results in movement of lithium and/or other metal ions from metal ion source 130 to anode 110, possibly at least partly forming the SEI (210A and/or 210B) and/or preventing or reducing lithium losses from the cathode 210D upon formation and/or operation, under corresponding operation conditions (connecting metal ion source, e.g., lithium source 130 to cathode 120 (see FIG. 3C) and operating electric circuitry 106 during or after formation step 280, when lithium in cathode(s) 120 is depleted). Arrow 220 indicated schematically the movement of metal ions (e.g., lithium) to anode 110 to form the SEI (see also FIG. 11).

FIG. 3C illustrates systems 100 and batteries 101, which comprise lithium source 130A within pouch cover 102, configured to provide additional lithium 210D to cathodes 120 (indicated schematically, in relation to cathodes 120), electrochemically, by applying specified voltage between cathodes 120 (e.g., via external contacts 121 thereof) and lithium source 130 (e.g., lithium source) in pouch cover 102 (e.g., via external contacts 131 thereof, see e.g., FIG. 3A), during and/or after formation process 240 of lithium ion battery 101 (e.g., via external contacts 111, 121 of anode(s) 110 and cathode(s) 120, respectively). Compensating 210D for lithium loss at cathode 120 may be carried out independently or complementarily to pre-lithiation and/or lithiation 210A of anode(s) 110, SEI formation through metal ions 210B and/or lithium supply during operation 210C. Any of anode(s) 110 and cathode(s) 120 may be lithiated in any of the disclosed configurations, sequentially or simultaneously, from same or different metal ion sources 130 (e.g., lithium source, possibly with additional metal sources) and using one or more components of electric circuitry 106. Arrow 240 indicated schematically the movement of lithium ions to cathode 120 to supplant cathode lithium which is fixated in the SEI or otherwise lost (see also FIG. 11).

Certain embodiments comprise combination of configurations illustrated in FIGS. 3A-3C, e.g., both anode(s) 110 and cathode(s) 120 may be lithiated (and/or provided with metal ions 210B for SEI formation on the anodes) from same or different metal ion source(s) 130, either being carried out externally (as illustrated e.g., in FIGS. 5A, 5B, 9 and 10) and/or internally (see e.g., FIGS. 6-8 below).

It is further noted that in various embodiments, lithiation 210A and/or provision of metal ions 210B may be carried out fully before formation process 280, lithiation 210A and/or provision of metal ions 210B may be carried out partly before formation process 280, and possibly continue during a first, second and/or later cycles of formation process 280. The relative timing, metal ion selection and configuration of metal ion source 130 may be adjusted to optimize the structure of the formed SEI and to improve the stability of batteries 101.

It is noted that anode(s) 110 may be pre-lithiated and/or lithiated 210A, and/or cathode(s) 120 may be lithiated 210D using the following embodiments. Embodiments referring to anodes 110 may be re-configured to be applicable to cathode(s) 120 and vice versa. Any of the disclosed embodiments may be applied to any electrode in battery 101.

Figure 4B:
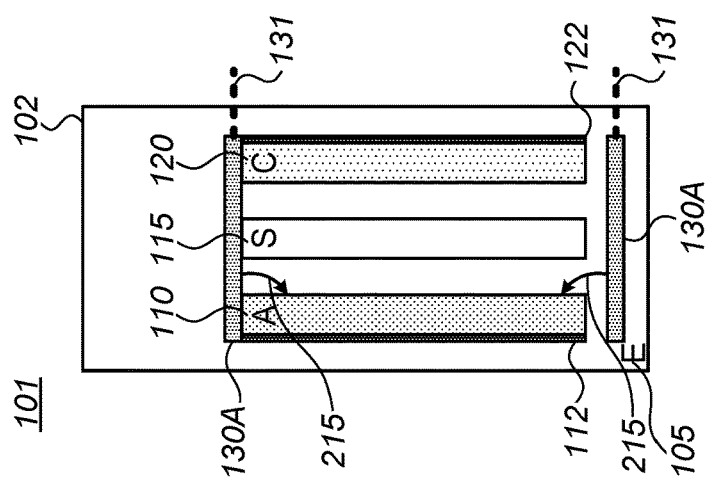
Figure 4A:
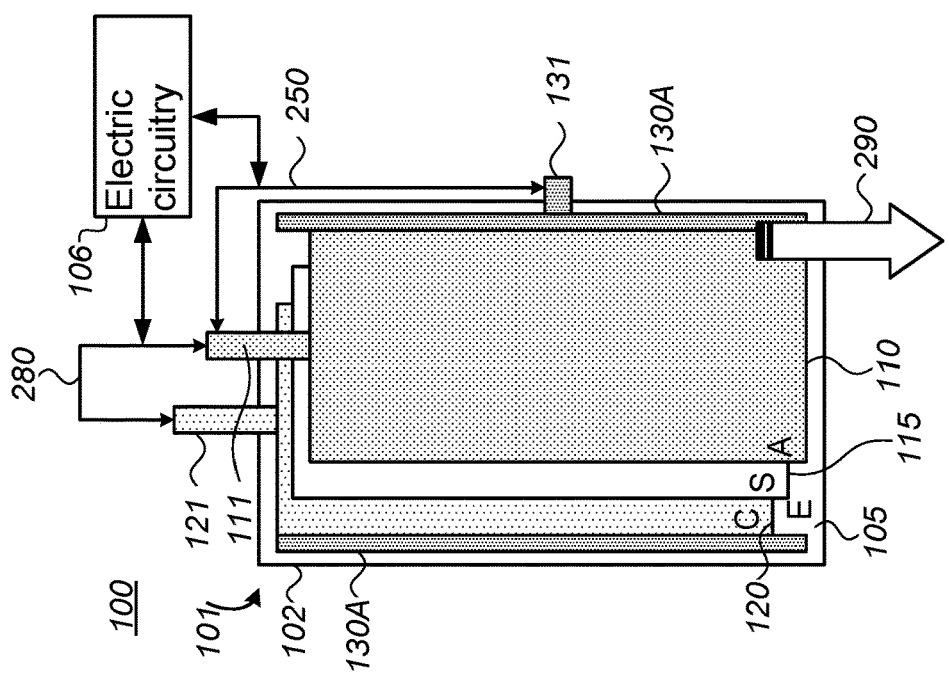

FIGS. 4A-4C are high level schematic illustrations of systems 100 and battery configurations 101 having various metal ion sources 130, according to some embodiments of the invention. In various embodiments, metal ion source 130 (e.g., lithium source) may be configured as pellets or beads illustrated in FIGS. 6, 7A-7B and 8 and/or as rods, bars, sheets or wires illustrated in FIGS. 3A-3B and 4A-4C. For example, FIG. 4A illustrates schematically one or more elongated metal ion sources 130A (e.g., lithium source) positioned along anodes 110 and FIG. 4B illustrates schematically one or more elongated metal ion sources 130A positioned perpendicularly to anodes 110 (SEI formation 215, possibly as a result of lithium ion movements from prelithiation 210A, is indicated schematically by arrows). Current collectors 112, 122 are depicted for anode 110 and cathode 120, respectively, e.g., in non-limiting examples, anode current collector 112 may be made of copper and cathode current collector 112 may be made of aluminum. Applying the specified voltage between anodes 110 and contact(s) 131 of metal ion source 130 are indicated schematically as electric connection and voltage application 250. Metal ion sources 130 may, in certain embodiments, be used without contacts and application of external voltage to supply metal ions via spontaneous chemical reaction upon contact with anode(s) 110 and/or cathode(s) 120. Alternatively or complementarily, contacts 131 (illustrated in broken lines to indicate they are optional) may be connected to metal ion source 130 to provide metal ions to anode(s) 110 and/or cathode(s) 120 electrochemically, in a controllable manner, by application of corresponding voltages between metal ion sources 130 and anode(s) 110 and/or cathode(s) 120.

FIG. 4C illustrates schematically one or more elongated metal ion sources 130A positioned perpendicularly to a cell stack 104 of alternating anodes 110, separators 115 and cathodes 120, cell stack 104 being composed of multiple cells 103, each cell 103 comprising one set of anode 110, separator 115 and cathode 120, with their corresponding current collectors 112, 122, electrolyte 105 and associated structures.

In various embodiments, metal ion source 130A (e.g., lithium source) may be spatially associated with one or more anode 110 and/or with one or more cathode 120 of stack 104, and be positioned to optimize the movement of lithium therefrom to anode 110. For example, metal ion source 130A may be positioned to minimize a distance to anodes 110, to provide as uniform as possible metal ion movement thereto (e.g., of any of $Li^+$, $Mg^{++}$, $Na^+$ etc.), and/or to enhance the stability of the formed SEI.

Metal ion sources 130 may, in certain embodiments, be used without contacts and application of external voltage to supply metal ions via spontaneous chemical reaction upon contact with anode(s) 110 and/or cathode(s) 120. Alternatively or complementarily, contacts 131 (illustrated in broken lines to indicate they are optional) may be connected to metal ion source 130 to provide metal ions to anode(s) 110 and/or cathode(s) 120 electrochemically, in a controllable manner, by application of corresponding voltages between metal ion sources 130 and anode(s) 110 and/or cathode(s) 120.

FIGS. 5A and 5B are high level schematic illustrations of systems 100 and battery configuration 101 having removable metal ion sources 130, according to some embodiments of the invention. In certain embodiments, metal ion source 130 may be configured to be removable from pouch cover 102 during degassing 290 of battery 101 following formation process 280. For example, metal ion sources 130 may be part of a tab 102A of pouch 102 which is separable from the main body of pouch 102, e.g., along a tearing line 135, as illustrated schematically in FIGS. 5A and 5B. In various embodiments, removal of metal ion source 130 may be carried out during degassing 290 (e.g., removal of wire-shaped metal ion source 130 through a degassing hole) and does not require an additional process stage. FIGS. 5A and 5B further illustrate various, non-limiting configurations of shapes and proportions of metal ion source 130, such as e.g., any of a strap, a rod or a bar (FIG. 5A), T shape, L shape and triangle (illustrated as alternatives in FIG. 5B, all attached to tab 131), which may have different orientations and possibly multiple tabs 131, to improve any of the prelithiation process, its kinetics, and the homogeneity of the resulting surface of the anode. Cathode lithiation 210D may be carried out in similar configurations, operated during or after formation, with respect to lithium-depleted cathodes. Applying the specified voltage between anodes 110 and contact(s) 131 of metal ion source 130—illustrated as a non-limiting example, may be modified to lithiate cathode 120 via contacts 121—are indicated schematically as electric connection and voltage application 250.

Figure 5C:
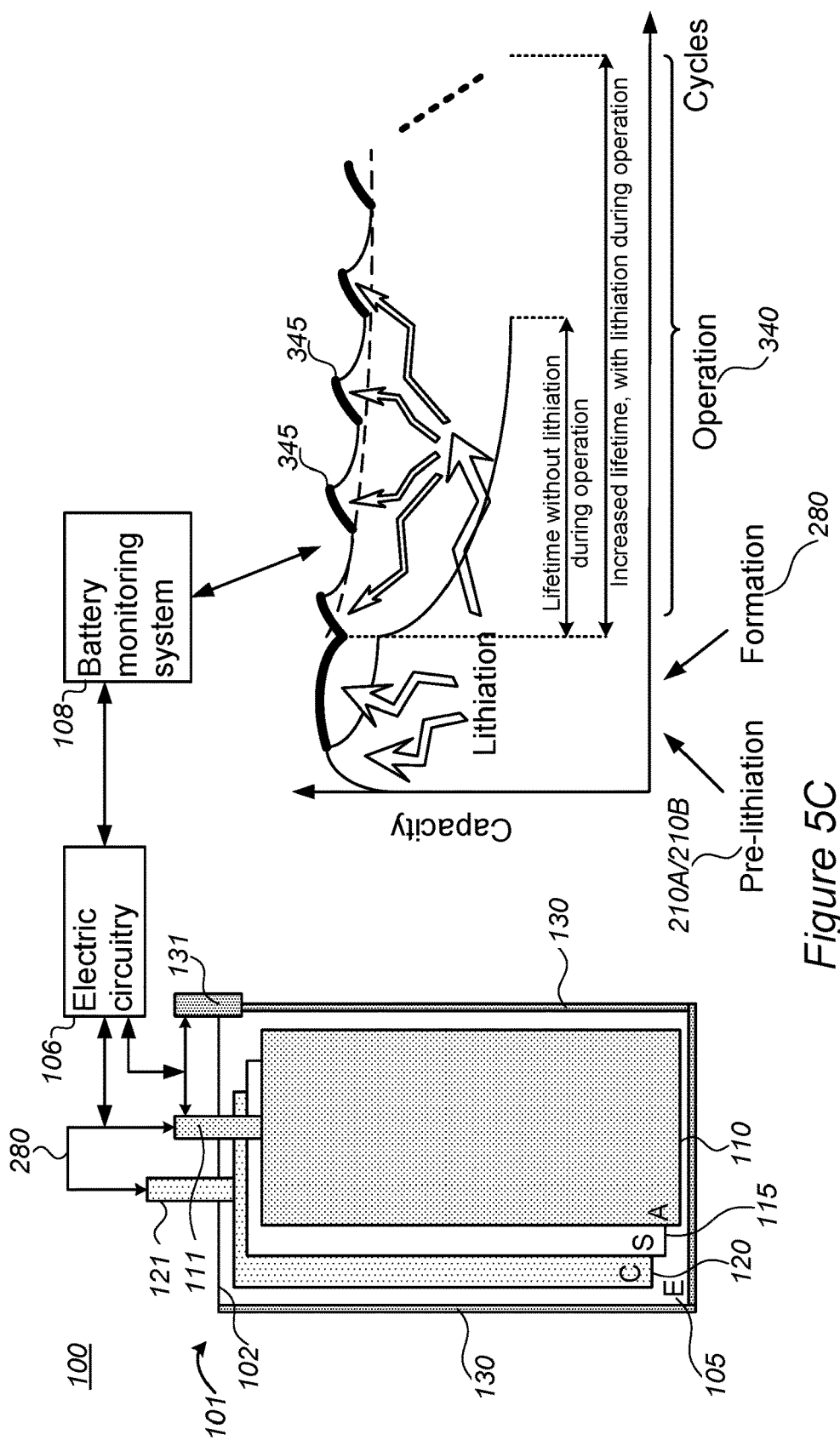
FIGS. 5C and 5D are high level schematic illustrations of system and battery configurations for lithiation during operation, according to some embodiments of the invention.
Figure 5D:
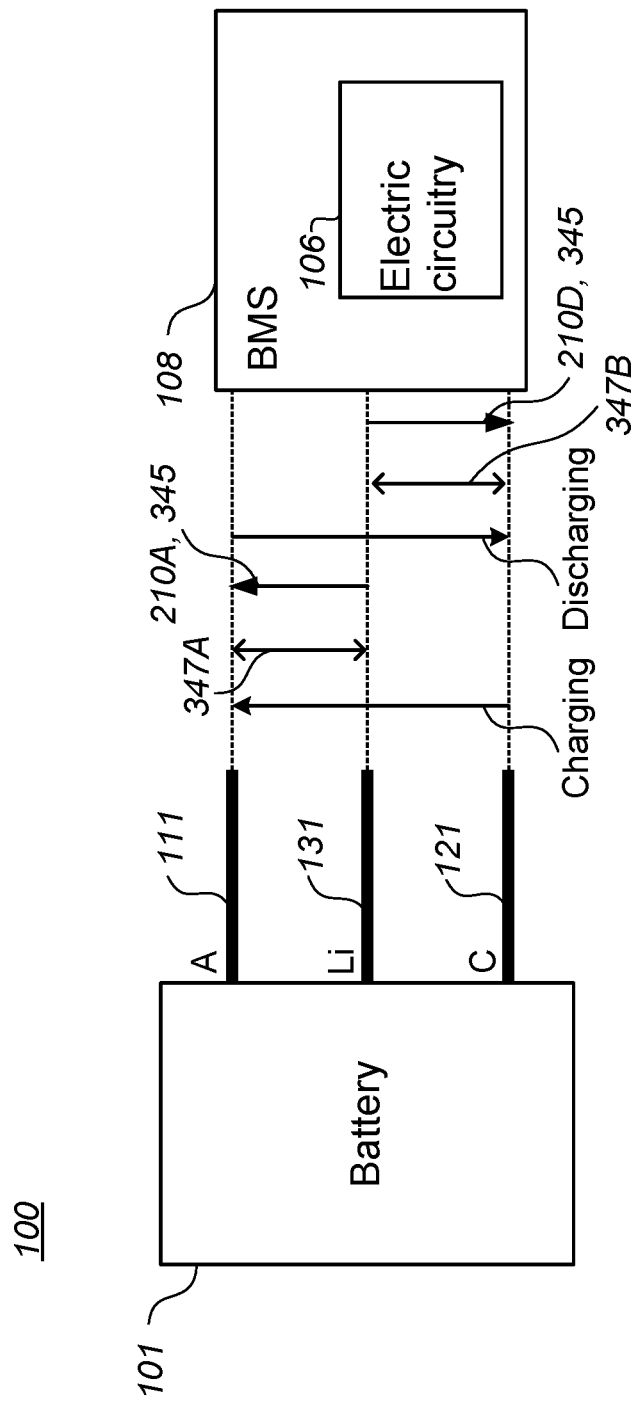

FIGS. 5C and 5D are high level schematic illustrations of system and battery configurations for lithiation during operation, according to some embodiments of the invention. FIG. 5C illustrates schematically effects of lithiation during operation on the battery's SoH during operation, while FIG. 5D illustrates schematically control parameters over lithiation during operation, as described below.

Alternatively or complementarily to regulating metal ions levels 210B and/or pre-lithiation 210A and/or lithiation during the formation process 280 described herein, lithiation may be carried out during operation stages 340. By incorporating lithium source 130 within pouch 102 of battery 101, additional lithium may be provided into the cell during operation to compensate for depletion of lithium in the cell during various processes involved in operation 340, such as charging and/or discharging cycles in which lithium may be consumed by further SEI formation, electrolyte decomposition, lithium fixation in the anode and/or in the cathode etc.

Contact 131 may be operated with respect to contacts 111 and/or 121 of anodes 110 and cathodes 120, respectively, to deliver additional lithium into the cell in a pre-programmed fashion (e.g., a certain amount after every certain number of cycles) and/or under specified circumstance—such as e.g., indications of a battery monitoring and management system (BMS) 108 associated with battery 101 of specified declines in capacity, increases in resistance, or any other state of health (SoH) parameters. Pulses of lithiation 345 are shown schematically in FIG. 5C to illustrate schematically the reduction in capacity decline of the battery due to applied lithiation 345, leading to increased lifetime, which may reach 50%, 100% or even more with respect to the lifetime of battery 101 without lithiation pulses 345 during operation 340. It is noted that lithiation during operation 340 may be carried out continuously, on-demand and/or in a pulsed patterned, the latter mode illustrated in a non-limiting manner in FIG. 5C.

Systems 100 may comprise a cell stack for lithium ion batteries 101, comprising alternating anodes 110, separators 115 and cathodes 120 packaged in pouch cover 102 (the anodes and cathodes being electrodes of the cell stack), lithium source 130 within pouch cover 102, having external contact 131 and being in fluid communication with anodes 110, and electric circuitry 106, configured to lithiate, electrochemically, anodes 110 by applying specified voltage between anodes 110 and lithium source 130 in pouch cover 102 via its contact 131, during operation of lithium ion battery 101 and controllably with respect to a state of health (SoH) thereof.

In certain embodiments, systems 100 may comprise a cell stack for lithium ion batteries 101, comprising alternating anodes 110, separators 115 and cathodes 120 packaged in pouch cover 102 (the anodes and cathodes being electrodes of the cell stack), lithium source 130 within pouch cover 102, having external contact 131 and being in fluid communication with cathodes 120, and electric circuitry 106, configured to lithiate, electrochemically, cathodes 120 by applying specified voltage between cathodes 120 and lithium source 130 in pouch cover 102 via its contact 131, during operation of lithium ion battery 101 and controllably with respect to a state of health (SoH) thereof.

In certain embodiments, systems 100 may be configured to lithiate anodes 110 and/or cathode(s) 120 selectively, according to SoH parameters of battery 101 (e.g., specified voltage drop, specified capacity fade, specified rise in resistance, specified energy throughput—any of which with respect to predefined thresholds.

As illustrated schematically in FIG. 5D, contacts 111, 121, 131 of anodes 110, cathodes 120 and lithium source 130, respectively, may be used for operating battery 101, lithiating anodes 110 and/or cathodes 120 (denoted as stages 210A, 210D, respectively, by delivering lithiation pulses 345) as well as monitoring anodes 110 and/or cathodes 120 with respect to lithium source 130 (indicated as stages 347A, 347B, respectively). Either or both electric circuitry 106 or of BMS 108 may perform or be involved in any of these functions. In certain embodiments, electric circuitry 106 may be realized as part of BMS 108 (as illustrated e.g., in FIG. 5D). In certain embodiments, electric circuitry 106 may be separated from BMS 108 and in communication therewith (as illustrated e.g., in FIG. 5C). Any of these configurations may be applicable in any of the embodiments presented above.

In any of the embodiments, systems 100 may comprise BMS 108, configured to monitor the SoH of lithium ion battery 101 and to control electric circuitry 106 to carry out the lithiating upon detecting specified decrease in the SoH. For example, BMS 108 may be further configured to distinguish, based on the monitored SoH, if anodes 110 or cathodes 120 are to be lithiated as the at least one of the electrodes, and to control electric circuitry 106 accordingly. BMS 108 may be further configured to measure a voltage between lithium source 130 and anodes 110 after charging (indicated schematically be arrow 347A) and/or cathodes 120 after discharging (indicated schematically be arrow 347B), and to control electric circuitry 106 accordingly.

In certain embodiments, BMS 108 may be configured to lithiate any of anodes 110 or cathodes 120, according to any specified criterion, and at any stage of charging or discharging.

It is noted that metal ion source 130 illustrated in any of FIG. 5A-5D may be considered as internal and/or external metal ion source 130A, 130B, respectively.

FIG. 6 is a high level schematic illustration of battery configuration 101 having metal ion sources 130A (e.g., lithium sources) as beads adjacent to anode(s) 110, according to some embodiments of the invention. Metal ion source 130A (e.g., lithium source) may comprise any number of beads, positioned in cells 103 and stacks 104, and may have any form. For example, metal ion source 130A may comprise beads positioned adjacent or onto anode(s) 110. In certain embodiments, at least some, or all, of metal ion source beads 130A (e.g., lithium source beads, or possibly mixed metal source beads of various metals) may be left in battery 101 during operation, and provide additional lithium supply to increase cycle life by providing lithium which is consumed internally during operation. In certain embodiments, at least some of metal ion source beads 130A may be removed, e.g., during degassing 290 (possibly preferentially with respect to the type of metal). It is noted that in case of metal ion source as beads or other small elements within pouch 102, prelithiation may be carried out electrochemically on the surface of anode 110 without establishment of an external electrical circuit (e.g., without tab(s) 131). Metal ion sources 130 may, in certain embodiments, be used without contacts and application of external voltage to supply metal ions via spontaneous chemical reaction upon contact with anode(s) 110 and/or cathode(s) 120. Alternatively or complementarily, contacts 131 (illustrated in broken lines to indicate they are optional) may be connected to metal ion source 130 to provide metal ions to anode(s) 110 and/or cathode(s) 120 electrochemically, in a controllable manner, by application of corresponding voltages between metal ion sources 130 and anode(s) 110 and/or cathode(s) 120.

FIGS. 7A and 7B are high level schematic illustrations of battery configuration 101 having metal ion sources 130A which are incorporated in current collector(s) 112, 122, according to some embodiments of the invention. In certain embodiments, metal ion source beads 130A may be incorporated in one or more of anode and/or cathode in current collector(s) 112, 122, respectively. For example, it is noted that in cell stack 104, cathode current collector(s) 122 are adjacent to anode(s) 110 of adjacent cell 103, so that incorporation of metal ion source 130A in cathode current collector(s) 122 may provide close lithium movement paths to anode(s) 110 in adjacent cells 103. In certain embodiments, incorporation of metal ion source 130A in current collector(s) 112 and/or 122 may be carried out by mixing and/or alloying lithium in current collector material, such as lithium copper mixture and/or alloy for anode current collector(s) 112 and/or as lithium aluminum mixture and/or alloy for cathode current collector(s) 122.

Metal ion sources 130 may, in certain embodiments, be used without contacts and application of external voltage to supply metal ions via spontaneous chemical reaction upon contact with anode(s) 110 and/or cathode(s) 120. Alternatively or complementarily, contacts 131 (illustrated in broken lines to indicate they are optional) may be connected to metal ion source 130 to provide metal ions to anode(s) 110 and/or cathode(s) 120 electrochemically, in a controllable manner, by application of corresponding voltages between metal ion sources 130 and anode(s) 110 and/or cathode(s) 120.

It is emphasized that different configurations of metal ion source 130A within batteries 101 may be combined to form additional embodiments. Also, any of the embodiments disclosed herein may be applied for any configuration of cell stacks 104, and while most illustrations present single cells 103 with one anode 110 and one cathode 120, this is done solely for explanatory purposes, and is not limiting the application of the invention to full cell stacks 104 and corresponding batteries 101.

FIG. 8 is a high level schematic illustration of system configuration 100 with fluid flow regulation of metal ion levels in one or more electrodes, with flows indicated as inflow 140 and outflow 145, according to some embodiments of the invention. In certain embodiments, regulation of metal ion levels may be carried out from external metal ion source 130B (shown schematically) by fluid provision 140 of lithium and/or any of Mg, Na, $Mg^{++}$, $Na^+$ etc., which may be used to continuously replace electrolyte 105 prior, or during formation process 280. In certain embodiments, the regulation of metal ion levels may comprise pre-lithiation 210A (see FIG. 1) of anodes 110 and/or provision of metal ions 210B (see FIG. 1) to anodes 110. In either case, provided Li, Mg, Na, $Li^+$, $Mg^{++}$ and/or $Na^+$ may contribute to the formation of SEI on anode(s) 110. In certain embodiments, the regulation of metal ion levels may comprise lithiation 210D (see FIG. 1) of cathodes 120 after or during formation steps.

Figure 9:
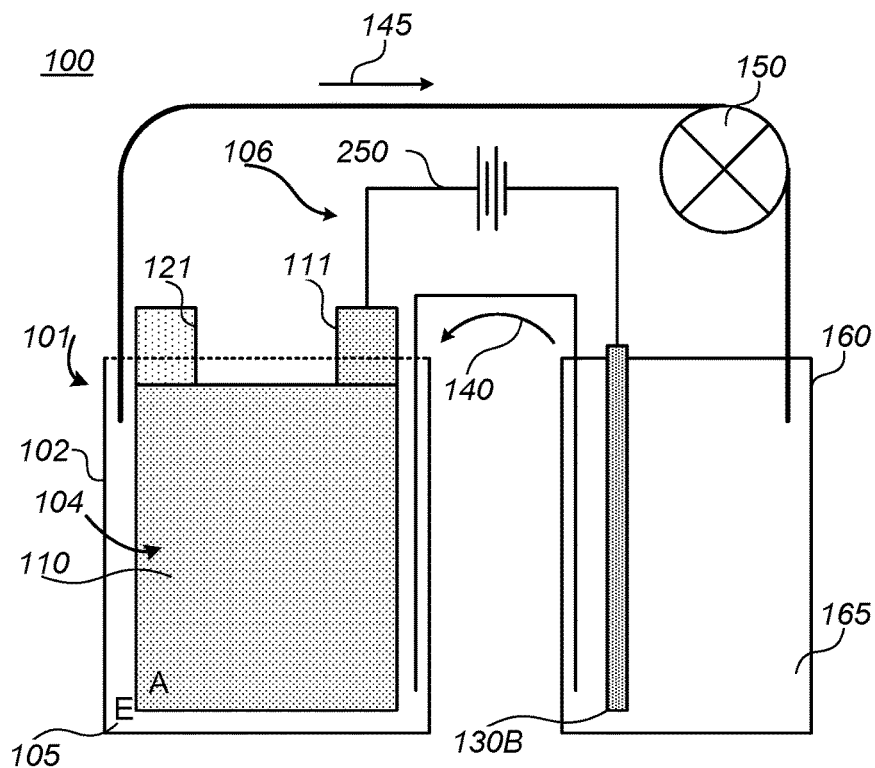
Figure 10:
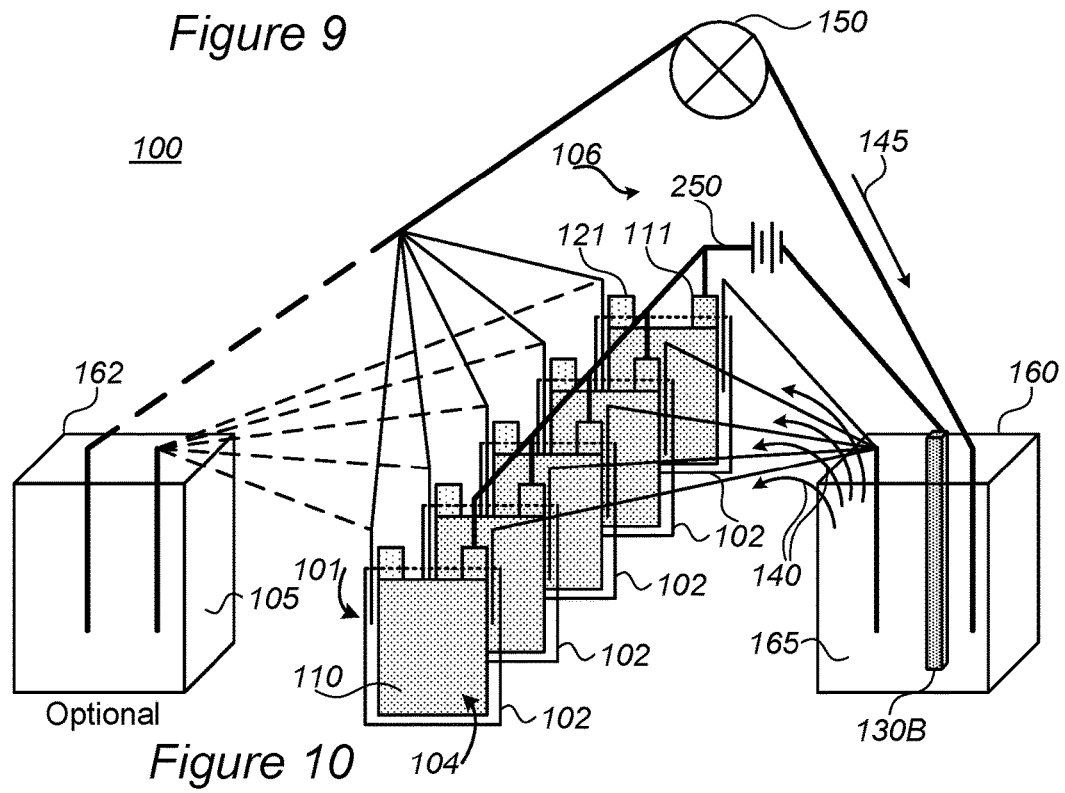

FIGS. 9 and 10 are high level schematic illustrations of systems 100 with fluid flow regulation of metal ion levels in one or more electrodes, with flows indicated as inflow 140 and outflow 145, according to some embodiments of the invention. System 100 may comprise at least one cell stack 104 for lithium ion batteries 101, each cell stack 104 comprising alternating anodes 110, separators 115 and cathodes 120 packaged in pouch cover 102, at least one electrolyte reservoir 160, having metal ion source(s) therein (e.g., in fluid 165 such as in electrolyte fluid), in fluid connection to cell stack(s) 104 in respective pouch cover 102, a pump 150 configured to maintain circular flow 140, 145 of electrolyte 165 between cell stack(s) 104 in pouch cover 102 and electrolyte reservoir 160, and electric circuitry 106 configured to apply specified voltage between anode(s) 110 of cell stack(s) 104 and the metal ion source(s) (comprising any of Li, Mg, Na, $Li^+$, $Mg^{++}$, $Na^+$ etc.,) in electrolyte reservoir 160, to regulate the level(s) of metal ion(s) in any of the components of batteries 101. In certain embodiments, the regulation of metal ion levels may comprise pre-lithiation 210A (see FIG. 1) of anodes 110 and/or provision of metal ions 210B (see FIG. 1) to anodes 110. In either case, provided Li, Mg, Na, $Li^+$, $Mg^{++}$ and/or $Na^+$ may contribute to the formation of SEI on anode(s) 110. In certain embodiments, the regulation of metal ion levels may comprise lithiation 210D (see FIG. 1) of cathodes 120 after or during formation steps. Applying the specified voltage between anodes 110 and contact(s) 131 of metal ion source 130B—illustrated as a non-limiting example, may be modified to lithiate cathode 120 via contacts 121—are indicated schematically as electric connection and voltage application 250.

In certain embodiments, electrolyte reservoir 160 may comprise at least two electrolyte reservoirs 160, 162, of which at least one (160) may be configured to regulate metal ion levels (210B) and/or to pre-lithiate 210A (and/or provide metal ions to) anodes 110 and form the SEI thereon, and at least another one (162) may be configured to load pouch cover 102 with electrolyte 105 for operation of lithium ion battery 101 after pre-lithiation 210A, possibly after formation 280. Formation process 280 may be carried out during or after the metal ions are regulated 210B, e.g., during prelithiation 210A and/or after prelithiation 210A is completed. Different, possibly multiple electrolyte reservoir 160, 162 may be used to provide different types and/or proportions of metal ions, possibly in different pre-lithiation and/or formation steps.

In certain embodiments, cell stack(s) 104 may comprise multiple cell stacks 104 in multiple batteries 101, and electrolyte reservoir(s) 160, 162 may be used simultaneously and commonly for all cell stacks 104 to carry out the regulation of metal ion levels and possibly electrolyte replacement.

FIG. 11 is a high level flowchart illustrating a method 200, according to some embodiments of the invention. The method stages may be carried out with respect to systems 100 and batteries 101 described above, which may optionally be configured to implement method 200. Method 200 may comprise stages for producing, preparing and/or using systems 100 and batteries 101, such as any of the following stages, irrespective of their order. Certain embodiments comprise computer program products comprising a computer readable storage medium having computer readable program embodied therewith and configured to carry out of the relevant stages of method 200. Method 200 may comprise stages for producing, preparing, operating, and/or using systems 100 and batteries 101 described above, such as any of the following stages, irrespective of their order.

Method 200 comprises regulating a level of metal ions in at least one electrode (e.g., anode(s) and/or cathode(s)) in a lithium ion battery, when the at least one electrode is in a pouch of the lithium ion battery (stage 210), wherein the regulation of metal ions level is carried out electrochemically between the at least one electrode and a metal ion source which is an internal and/or an external metal ions source containing e.g., Li, Mg and/or Na (stage 212), prior to, and possibly during a formation process of the lithium ion battery, and possibly prior to and/or during the operation of the battery (stage 213). Regulating the metal ion levels may be carried out in situ, within the battery pouch, on anode(s) and/or cathode(s) of a cell stack, sequentially or simultaneously, from an internal metal ion source, in the pouch. Certain embodiments of providing metal ions to the anodes before the formation process is carried out may be referred to as a pre-metallization stage. Metal ions such as $Mg^{++}$ and $Na^+$ may be provided, possibly in addition to $Li^+$, as well as metal atoms e.g., Li, Mg, Na.

In certain embodiments, regulation 210 may comprise any of the following: pre-lithiating the anodes (as the electrodes, the anodes may comprise anode material particles of at least one of Si, Ge and Sn which may be polymer-coated) from the at least one lithium source (as the metal ion source) prior to the formation process (stage 220); lithiating the anodes from the at least one lithium source during the formation process (stage 225), and possibly also during operation from at least rudiments of the at least one lithium source which are left in the pouch during operation (stage 227); forming at least part of the SEI on the anodes from magnesium and/or sodium from the at least one magnesium and/or sodium source (as the metal ion source, possibly in combination with lithium), at least prior to the formation process (stage 230); and/or lithiating the cathodes (as the electrodes) from the at least one lithium source (as the metal ion source) upon lithium depletion from the cathodes, during and/or after the formation process (stage 240).

Method 200 may comprise connecting, electrically, electrode(s) to the metal ion source and applying a voltage therebetween (stage 250). Pre-lithiating and/or lithiating the anodes may be carried out by electrically connecting the anode(s) to the metal ion source and applying a voltage therebetween. Lithiating the cathodes may be carried out by electrically connecting the at least one cathode (when it is a depleted state, having part of its original lithium content) to the metal ion source and applying a voltage therebetween.

Pre-lithiating and/or lithiation of the anode(s) 220, 225, respectively, may be configured to at least partly form, controllably, an SEI on the anode(s), during a pre-lithiation, pre-metallization (referring e.g., to provision of Mg and/or Na ions, alone or in addition to Li ions) and/or during the formation process, utilizing the metal ion source (stage 260). In certain embodiments, lithiating 225 may be configured to compensate for lithium consumption during the formation process, e.g., from the cathode(s)—for example by adding lithium to the cathode 240 during the formation process, from the lithium source.

Method 200 may further comprise incorporating metal lithium in a pouch comprising a cell stack and electrolyte (stage 270) and carrying out any of stages 210 to 240 using the internal lithium source, at least partly. Correspondingly, method 200 may comprise pre-lithiating anode(s) of the cell stack electrochemically by electric connection thereof to the metal lithium (and/or Mg, Na, etc.) incorporated in the pouch (stage 272) and/or lithiating cathode(s) of the cell stack electrochemically by electric connection thereof to the metal lithium (and/or Mg, Na, etc.) incorporated in the pouch (stage 274).

Method 200 may further comprise performing the formation process, with anodes and cathodes as the cell electrodes (stage 280). Method 200 may further comprise degassing the pouch following the formation process (stage 290). Method 200 may further comprise removing the metal ion source after pre-lithiation 210 during degassing phase 290 following formation process 240 (stage 292). In certain embodiments, method 200 may comprise removing residual lithium during the degassing phase (stage 294), and possibly re-using the removed residual metal lithium (stage 296).

Anode pre-lithiation 220 may be carried out prior to formation process 280 (stage 302) and/or anode lithiation 225 may be carried out during formation process 280 (stage 304). It is noted that lithiation during the formation process may augment pre-lithiation applied before the formation process. Additional lithiation during the formation process may be configured to compensate for lithium consumption during the formation process, e.g., from the cathode(s).

Method 200 may further comprise optimizing a shape and/or a position of the metal ion source within the pouch (stage 310), possibly optimizing a position of the metal ion source in the stack, according to the efficiency of metal ions movement (stage 315), e.g., with respect to pre-lithiation 220, and/or metal ion regulation and/or lithiation of any of stages 225-240.

Method 200 may comprise associating, at least partly (for example, spatially), the metal ion and/or lithium source with the anode(s) in the stack (stage 320) and/or with the cathode(s) in the stack (stage 322). In certain embodiments, method 200 may comprise incorporating metal lithium, as a lithium source, and/or other metal mixtures or alloys of e.g., Mg, Na, Li, in at least one current collector (stage 330), e.g., in at least one anode current collector and/or in at least one cathode current collector, e.g., in mixture with copper and/or as a copper alloy in the former case, and/or in mixture with aluminum and/or as an aluminum alloy in the latter case.

Method 200 may comprise incorporating metal lithium in a small quantity in the pouch, without removal thereof from the pouch (stage 335). Incorporated lithium may be thus used to at least partly compensate for losses of lithium during operation of the battery. Method 200 may comprise operating the lithium ion battery (stage 340). Method 200 may comprise incorporating metal lithium in wire form in the pouch and carrying out lithiation during operation (stage 342), to compensate for depletion of lithium in the cell during various processes involved in operation, such as charging and/or discharging cycles in which lithium may be consumed by further SEI formation, electrolyte decomposition, lithium fixation in the anode and/or in the cathode etc. Lithiation 342 may be continuous or intermittent, and possibly be related to SoH parameters of the battery (stage 345).

Method 200 may further comprise monitoring the SoH of the lithium ion battery and carrying out the lithiating upon detected specified decrease in the SoH (stage 347), e.g., using SoH parameters such as reduction in capacity, rise in resistance, decreasing maximal voltage etc.). In certain embodiments, monitoring 347 may comprise either or both monitoring the anodes and monitoring the cathodes with respect to lithium source itself (see e.g., FIG. 5D), e.g., by measuring the anodes and/or cathodes with respect to the lithium source (stage 348). Method 200 may further comprise lithiating anodes after charging and/or cathodes after discharging of the cell (stage 349), or possibly during partial charging and/or discharging, respectively. For example, the selection of anodes and/or cathodes for lithiation may be carried out according to a voltage level between the anodes and the lithium source after the charging and/or according to a voltage level between the cathodes and the lithium source after the discharging.

Method 200 may comprise positioning the metal ion source along and/or perpendicularly to a cell stack of the battery (stage 350). In certain embodiments, method 200 may comprise positioning the metal ion source in a removable part of the pouch (stage 352). In certain embodiments, method 200 may comprise associating, spatially, the metal ion source with opening(s) for degassing (stage 355).

Method 200 may comprise connecting electrolyte reservoir(s), having metal ion source therein, in fluid connection to the cell stack in the pouch cover (stage 360) and carrying out any of the metal ion regulation stages via the fluid connection. In certain embodiments, method 200 may comprise pumping electrolyte between the reservoir(s) and the cell stacks in the pouches (stage 365), possibly with different electrolyte reservoir(s) providing different electrolyte compositions, such as one or more electrolyte compositions for pre-lithiation, for SEI formation, for consequent lithiation, for filling operative electrolyte for the operation cycles etc. For example, method 200 may comprise maintaining circular flow of electrolyte between the cell stack in the pouch cover and the electrolyte reservoir(s) (stage 370), see e.g., flows 140, 145 in FIGS. 9 and 10.

Method 200 may further comprise applying specified voltage between the anodes and the metal ion source in the electrolyte reservoir(s) (stage 380). Method 200 may further comprise configuring at least one electrolyte reservoir to provide the pre-lithiation and at least another electrolyte reservoir to load the pouch cover with electrolyte for operation of the lithium ion battery (stage 390). Method 200 may comprise applying the metal ion regulation (e.g., pre-lithiation and/or lithiation) simultaneously to multiple cell stacks with the electrolyte reservoir(s) used commonly for all the cell stacks (stage 400).

In various embodiments, regulation of metal ions level 210 may be carried out in any of constant current (CC), constant voltage (CV), and/or constant current, constant voltage (CCCV) modes, as well as in dynamic current ($dI/dt \neq 0$) and/or dynamic voltage ($dV/dt \neq 0$) modes alone or in combination. Currents may range from 10 µA to 10 mA and voltage may vary from 400 mV to 20 mV. Prelithiation time may be in scales of a few hours to a few weeks. Temperature may vary from 25° C. to 70° C.

In certain embodiments, anode(s) 110 may comprise anode active material particles and additive(s) such as binder(s) (e.g., polyvinylidene fluoride (PVDF), styrene butadiene rubber (SBR) or any other binder), plasticizer(s) and/or conductive filler(s), mixed in water-based or organic solvent(s). The anode slurry may be dried, consolidated and positioned in contact with current collector 112. Anode active material particles may comprise particles of any of graphite, graphene, metalloids such as silicon, germanium and/or tin, and/or possibly particles of aluminum, lead and/or zinc. Anode active material particles may be configured to receive lithium during charging and release lithium during discharging, reversibly over a large number of cycles, without mechanical damage to anode(s) 110. The anode active material particles may be composite materials, e.g., coated particles, shell-core particles etc. The anode active material particles may comprise coatings such as conductive polymers, lithium polymers, possibly borate and/or phosphate salt(s) (forming e.g., $B_2O_3$, $P_2O_5$ etc. on the surface of anode active material particles), bonding molecules which may interact with electrolyte 105 (and/or ionic liquid additives thereto) and/or various nanoparticles (e.g., $B_4C$, WC, VC, TiN) which may be attached to the anode material particles in anode preparation processes such as ball milling. The size range of the anode active material particles may be at an order of magnitude of 100 nm, and/or possibly in the order of magnitude of 10 nm or 1µ. The size range of nanoparticles attached to the anode active material particles may be at an order of magnitude lower than that of the anode material particles, e.g., 10 nm, and/or possibly 100 nm (the latter in case of larger anode material particles).

In certain embodiments, cathode(s) 120 may comprise materials based on layered, spinel and/or olivine frameworks, and comprise various compositions, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) LFP formulations (based on $LiFePO_4$), lithium rich cathodes, and/or combinations thereof. Separator(s) 115 may comprise various materials, such as polyethylene (PE), polypropylene (PP) or other appropriate materials.

Examples for electrolyte 105 may comprise liquid electrolytes such as ethylene carbonate (EC), diethyl carbonate (DEC), propylene carbonate (PC), fluoroethylene carbonate (FEC), ethyl methyl carbonate (EMC), dimethyl carbonate (DMC), vinylene carbonate (VC), possibly tetrahydrofuran (THF) and/or its derivatives, and combinations thereof; and/or solid electrolytes such as polymeric electrolytes such as polyethylene oxide, fluorine-containing polymers and copolymers (e.g., polytetrafluoroethylene), and combinations thereof. Electrolyte 105 may comprise lithium electrolyte salt(s) such as $LiPF_6$, $LiBF_4$, lithium bis(oxalato) borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$, tris(trimethylsilyl)phosphite (TMSP) and combinations thereof. Ionic liquid(s) additives may be added to electrolyte 105.

Figure 12:
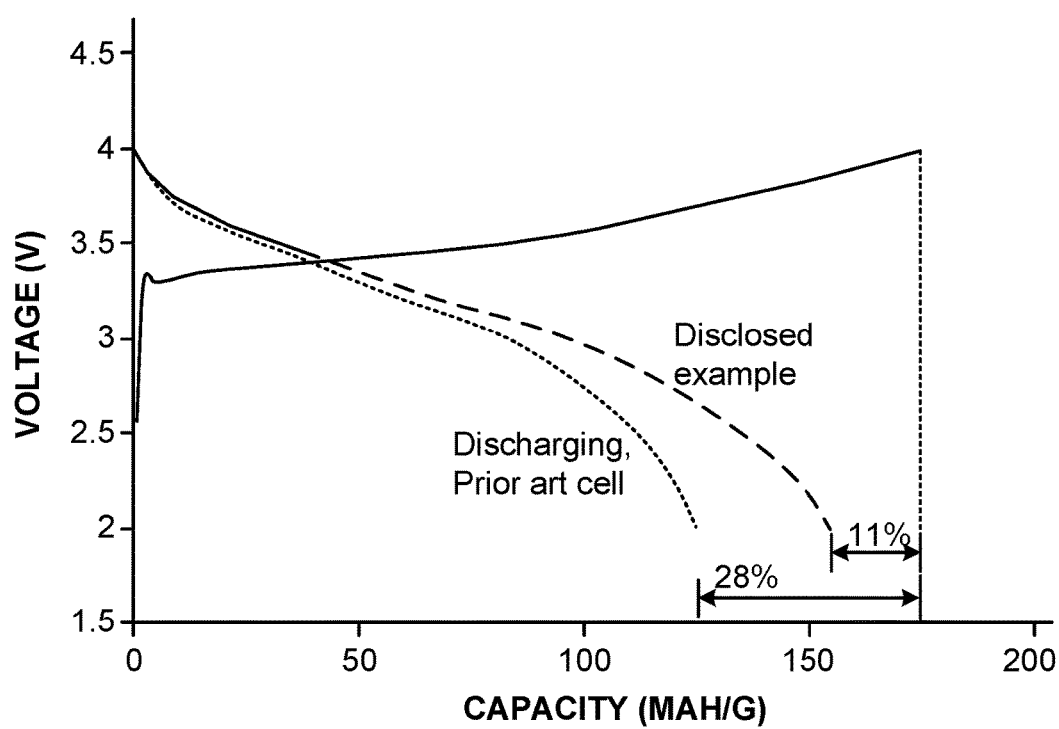
FIG. 12 provides an example of results illustrating the improved operation of batteries resulting from systems and/or methods, according to some embodiments of the invention.

FIG. 12 provides an example of results illustrating the improved operation of batteries 101 resulting from systems 100 and/or methods 200, according to some embodiments of the invention. FIG. 12 illustrates schematically a charging curve (solid line) and discharging curves of a first cycle, for prior art full cell (dotted line) and for full cell 101 (dashed line) with pre-lithiated anode. In the presented example, concerning metalloid systems normalized to NCA cathodes, the capacity loss (full cycle equivalent, FCE) is improved from ca. 28% (leaving ca. 72% capacity) in the prior art full cell (dotted line) to ca. 11% (leaving ca. 89% capacity) in full cell 101 with pre-lithiated anode (dashed line).

Certain embodiments comprise computer program products comprising a computer readable storage medium having computer readable program embodied therewith and configured to monitor, control and/or operate systems 100 and batteries 101 to provide the regulation of metal ions and/or lithiation steps described above, such as pre-lithiation, lithiation during formation and/or lithiation during operation, possibly in conjuncture with the carrying out of the formation processes and/or operating batteries 101. Certain embodiments comprise battery management systems comprising computer readable program configured to operate any of the method stages disclosed above.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
regulating a level of metal ions in at least one electrode of a lithium ion battery, wherein the lithium ion battery comprises the at least one electrode, at least one separator and electrolyte within a battery pouch, and undergoes a formation process prior to being operable,
wherein the regulating is carried out electrochemically between the at least one electrode and a solid metal ion source, at least prior to or during the formation process of the lithium ion battery, and wherein the at least one electrode and the solid metal ion source are within the battery pouch during said regulating of the level of metal ions.

2. The method of claim 1, wherein said regulating is carried out by electrically connecting the at least one electrode to the solid metal ion source and applying a voltage therebetween.

3. The method of claim 1, further comprising carrying out said regulating of the metal ions level prior to as well as during the formation process.

4. The method of claim 1, further comprising configuring the metal ion source to be elongated and positioning the metal ion source along anodes in a cell stack of the battery.

5. The method of claim 1, further comprising associating, spatially, the metal ion source with the at least one anode and/or with at least one cathode of the battery.

6. The method of claim 1, further comprising incorporating the metal ion source in at least one current collector of the battery.

7. The method of claim 1, further comprising removing the solid metal ion source during a degassing stage which is carried out after the regulating of the level of the metal ions and after the formation process.

8. The method of claim 1, wherein the at least one electrode comprises anodes of the lithium ion battery and the solid metal ion source comprises at least one solid lithium source, and wherein the regulating of the metal ions level comprises pre-lithiating the anodes from the at least one solid lithium source prior to the formation process.

9. The method of claim 8, wherein the anodes comprise anode material particles of at least one of Si, Ge and Sn and are polymer coated.

10. The method of claim 1, wherein the at least one electrode comprises cathodes of the lithium ion battery and the metal ion source comprises at least one lithium source, and wherein the regulating of the metal ions level comprises lithiating the cathodes from the at least one lithium source upon lithium depletion from the cathodes, during and/or after the formation process.

11. The method of claim 1, wherein the at least one electrode comprises anodes of the lithium ion battery and the metal ion source comprises at least one magnesium and/or sodium source, and wherein the regulating of the metal ions level comprises forming at least part of an SEI (solid electrolyte interphase) on the anodes from magnesium and/or sodium from the at least one magnesium and/or sodium source, at least prior to the formation process.

12. The method of claim 1, further comprising degassing the lithium ion battery after the formation process thereof.

13. The method of claim 12, further comprising removing the solid metal ion source from the lithium ion battery during the degassing thereof.

14. The method of claim 1, wherein the solid metal ion source is in wire form.

15. The method of claim 1, wherein said regulating of the metal ions level is carried out during the formation process.

16. The method of claim 15, wherein the solid metal ion source comprises a solid lithium source.

17. The method of claim 1, wherein the at least one electrode comprises at least one anode of the lithium ion battery and further comprising carrying out said regulating between the solid metal ion source and the at least one anode.

18. A system comprising:
a cell stack for lithium ion batteries, comprising alternating anodes, separators and cathodes, packaged in a pouch cover, the anodes and cathodes being electrodes of the cell stack,
a solid metal ion source set within the pouch cover and having an external contact,
electric circuitry, configured to regulate, electrochemically, a level of metal ions in at least one of the electrodes by applying a specified voltage between at least one of the electrodes and the solid metal ion source in the pouch cover, at least prior to or during a formation process of the lithium ion battery.

19. The system of claim 18, wherein the solid metal ion source is a solid lithium metal source.

20. The system of claim 19, wherein the solid lithium metal source is elongated and positioned along the alternating anodes and/or positioned perpendicularly to the alternating anodes, separators and cathodes in the cell stack.

21. The system of claim 18, wherein the electric circuitry is configured to apply the specified voltage between at least one of the anodes and the solid metal ion source.

* * * * *